Oct. 31, 1950   W. M. ZWOSTA   2,528,204
MEAT CURING PROCESS
Filed Oct. 22, 1948
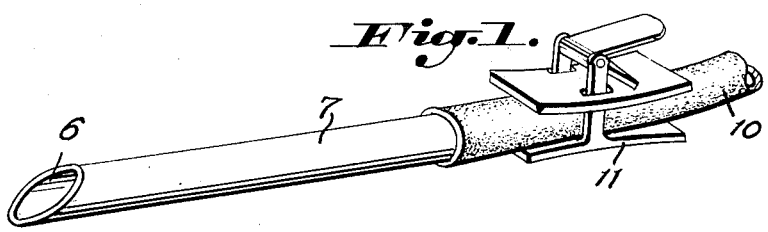
Fig.1.
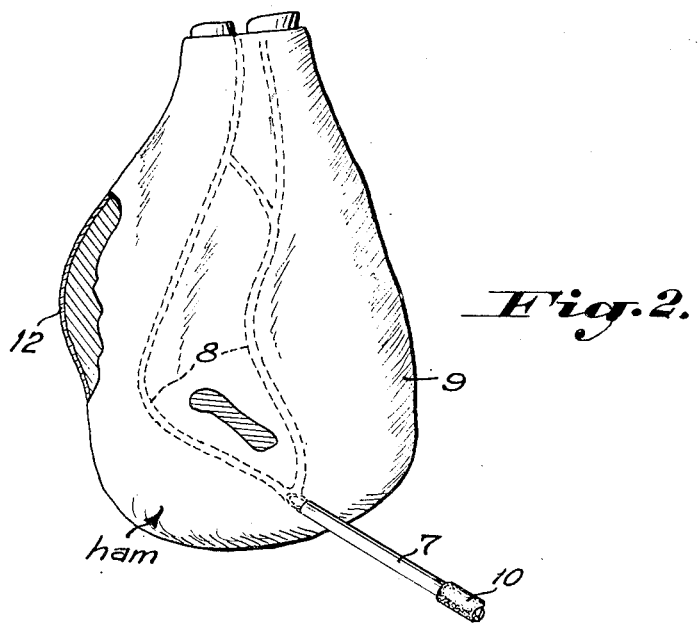
Fig.2.
Fig.3.
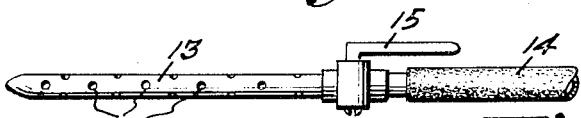
Fig.4.
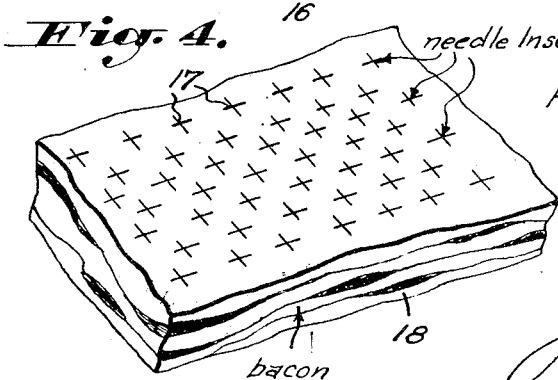
Fig.5.
Inventor
William Martin Zwosta
John N. Randolph
Attorney Patented Oct. 31, 1950

2,528,204

UNITED STATES PATENT OFFICE 2,528,204

MEAT CURING PROCESS

William Martin Zwosta, Columbus, Ohio

Application October 22, 1948, Serial No. 55,900

4 Claims. (Cl. 99—159)

This invention relates to a novel process or method for effecting the rapid curing of fresh meat such as hams, bacon, callies, shoulders, cottage hams, squares, jowls and Canadian bacon.

It is a primary object of the present invention to provide a method whereby fresh meat does not require being put down in a pickle solution or a dry cure for a period of time and whereby the pickle solution is injected into the meat by a pumping process and the meat thereafter immediately subjected to a heating and smoking process simultaneously to effect curing of the meat in a minimum of time and so that the meat will be ready for sale within a period of twenty-four hours from the time that the animal is killed.

Another object of the invention is to provide a curing process which will produce a smoked meat having a permanent color and excellent flavor.

Still another object of the invention is to provide a meat curing process wherein a paste is applied to the meat after injection of the pickle solution for protecting the outside of the meat during the curing.

Various other objects and advantages of the invention will hereinafter become apparent from the following description illustrated by the accompanying drawing wherein:

Figure 1 is an enlarged perspective view of a needle used for injecting the pickle solution into a ham or callie;

Figure 2 is a plan view showing the needle applied to the artery of a ham;

Figure 3 is a plan view of a needle used for injecting the pickle solution in a bacon or similar cuts of meat;

Figure 4 is a perspective view looking toward the inner side of a bacon, and

Figure 5 is a sectional view of a portion of the bacon showing the paste coating applied thereto.

In accomplishing the process or method of curing a ham, shoulder or callie, the tapered discharged end 6 of a conventional needle 7 for this purpose is injected into the artery 8 of a ham 9. The pickle solution is pumped into the ham through the artery 8 in a quantity equal approximately to 10% of the weight of the ham and two-thirds of the pickle solution is pumped into the artery of the cushioned side of the ham and the remaining one-third into the artery in the stifle side of the ham. This pickle is pumped by means of a suitable pumping means and from a suitable source, not shown, through a hose 10 provided with a clamp 11 forming a valve for regulating the flow of the pickle solution.

A preferred pickle solution for hams, shoulders and callies is composed of 45 lbs. of granulated cane sugar, 2 lbs. 15 oz. of nitrite of soda, 4 oz. of potassium nitrate which is mixed with 2 gals. of water and brought to a temperature of 214° Fahrenheit and thereafter immediately chilled to 38° Fahrenheit with cracked ice, after which 225 lbs. of table salt is added to the mixture and sufficient water to produce a salometer reading of 63°. The above ingredients will produce approximately 150 gals. of the pickle solution.

After the pickle solution has been pumped into the ham, the ham is immediately coated with a paste composed of 44 lbs. of table salt, 25 lbs. of granulated cane sugar, 1 lb. 5 oz. nitrite of soda and 4 oz. of potassium nitrate. The nitrite and nitrate are mixed with 4 lbs. of water and brought to a temperature of 214° Fahrenheit and then immediately chilled to 38° with cracked ice after which the salt and sugar is added together with 13 lbs. of edible boiled corn starch to which is added water in the amount of approximately 4 parts water to one part of corn starch which, when mixed, will produce a paste capable of being readily applied to the meat.

A very light coating of the paste cure is applied to the outside of the ham, as indicated at 12 in Figure 2, after which the ham is immediately placed in a smoke house and the temperature brought to 150° Fahrenheit for six hours and thereafter raised to 170° until the internal temperature of the ham is approximately 142°, which temperature is then maintained for two hours. The ham is thereafter immediately chilled and ready for sale since the ham is subjected to smoking simultaneously with the heating. The curing and smoking of a ham of from ten to fifteen pounds can be accomplished in approximately twelve hours. The effect of the heat on the pickle solution and paste produces a cured or smoked ham possessing a fine flavor and rich color.

For processing bacon and other cuts of meat a needle 13 is utilized into which the pickle solution is pumped through a hose 14 and controlled by a valve 15. The needle 13 has a tapered closed outer end and a series of longitudinally spaced openings 16 from which the pickle solution is ejected. The needle 13 is inserted into stitches 17 on the inner side of a bacon 18 or other cut of meat, as illustrated in Figure 4. Into each of the stitches 17 approximately 1 oz. of the pickle solution is pumped. The pumping needle is inserted perpendicular to the meat and into each of the stitches which are approximately two and one-half inches apart. Not more than approximately 8% by weight of the pickle solution as compared to the weight of the heat is injected. The pickle solution for injection into bacon and other cuts of meat is preferably composed of 45 lbs. of granulated cane sugar, 2 lbs. 15 oz. nitrite of soda, 4 oz. of potassium nitrate which is mixed with 2 gals. of water and brought to a temperature of 214° Fahrenheit and thereafter immediately chilled with cracked ice to 38°, after which 215 lbs. of table salt and sufficient water is added to provide a salometer reading of 58°. This mixture will likewise produce approximately 150 gals. of the pickle solution.

Immediately after the bacon has thus been stitch pumped a very thin coat of the paste cure, previously described, is applied and the meat is then immediately placed in the smoke house and subjected to heat and smoke. The meat is subjected to heat from approximately 145° to 150° Fahrenheit until the internal temperature of the meat is brought to 120°, requiring approximately eight to ten hours, the meat is then chilled and ready for sale.

Various modifications and changes are contemplated and may be resorted to, without departing from the spirit or scope of the invention as hereinafter defined by the appended claims.

I claim as my invention:

1. A meat curing process consisting in injecting a chilled pickle solution into fresh meat, immediately thereafter coating the meat with a chilled curing paste, immediately thereafter subjecting the meat to heat and smoke at a temperature between 145° F. and 170° F. for a period not exceeding twelve hours, and thereafter immediately chilling the meat.

2. A meat curing process consisting of pumping a chilled pickling solution into fresh meat, then immediately coating the meat with a chilled pickling paste, and then immediately subjecting the coated meat to smoke and heat simultaneously until an internal temperature of the meat of approximately 142° F. is obtained and maintained for two hours, and thereafter immediately chilling the meat, the entire process taking place within twenty-four hours.

3. A meat curing process as in claim 2, wherein the pickling solution which is pumped into the meat is prepared by mixing granulated cane sugar, nitrite of soda, potassium nitrate with water and heating the mixture to a temperature of 214° F. and thereafter immediately chilling the mixture to a temperature of 38° F. and finally adding table salt and water to the mixture sufficient to produce a salometer reading of 36°.

4. A meat curing process as in claim 2, wherein the pickling paste is prepared by mixing nitrite of soda and potassium nitrate with water and heating the mixture to a temperature of 214° F. and thereafter immediately chilling the mixture to a temperature of 38° F. and subsequently adding table salt, granulated cane sugar, edible boiled cornstarch mixed with water to the mixture to produce the paste which is capable of adhering to the meat.

WILLIAM MARTIN ZWOSTA.

REFERENCES CITED

The following references are of record in the file of this patent:

UNITED STATES PATENTS

| Number | Name | Date |
|---|---|---|
| 221,541 | Fagersten | Nov. 11, 1879 |
| 1,280,772 | Legg | Oct. 8, 1918 |
| 2,054,624 | Griffith | Sept. 15, 1936 |
| 2,084,864 | Paddock | June 22, 1937 |
| 2,137,898 | McKee | Nov. 22, 1938 |
| 2,173,992 | Allen | Sept. 26, 1939 |
| 2,180,750 | Urbain | Nov. 21, 1939 |